United States Patent Office 3,112,247
Patented Nov. 26, 1963

3,112,247
BETA PHASE CALCIUM PYROPHOSPHATE DENTIFRICE ABRASIVES AND METHODS FOR THEIR PREPARATION
Henry C. Schweizer, Cincinnati, Ohio, assignor to The Procter & Gamble Company, Cincinnati, Ohio, a corporation of Ohio
No Drawing. Filed Jan. 26, 1962, Ser. No. 169,098
6 Claims. (Cl. 167—93)

This invention relates to improved dentifrice abrasives. More particularly it relates to calcium pyrophosphate abrasives which are adaptable to use in dentifrices containing soluble fluoride salts as enamel solubility reducing agents. The invention further relates to methods for preparing these improved calcium pyrophosphate abrasives.

The efficacy of soluble fluorides for reducing the solubility of dental enamel is well known. Although topical application of water solutions of various fluoride salts has become commonplace, the successful application of this material through a dentifrice medium has been hindered by the propensity of usual dentifrice ingredients, notably abrasives, to react with fluoride to form insoluble fluoride salts which are unavailable for reaction with dental enamel.

Nebergall, U.S. Patent 2,876,166, issued March 3, 1959, teaches that certain abrasives can be rendered less reactive with fluorides by heat treatment. Broge et al., U.S. Patent 2,876,168, granted March 3, 1959, disclose an improved calcium pyrophosphate cleaning agent which is prepared by heat treatment of dicalcium orthophosphate dihydrate at certain prescribed heating rates. Although the abrasives prepared in accordance with the teachings of these patents are substantially superior to other known dentifrice abrasives with respect to ionic compatibility and in the case of the Broge et al. abrasives, vastly superior in cleaning efficacy, there is still room for improvement in ionic compatibility, insofar as this attribute can be attained without adversely affecting other desired characteristics.

Thus, it is known that calcium pyrophosphate has substantially better fluoride compatibility than dicalcium orthophosphate dihydrate from which it may be derived by a heat treatment which serves to drive off the water of crystallization and essentially all of the water of constitution. It is also known that the calcium pyrophosphate formed in this manner may assume various crystalline phases, including the gamma, beta, and alpha phases, depending on the conditions of heat treatment. It has heretofore been understood that as the relative proportion of beta phase material increases in calcium pyrophosphate, so also does the relative abrasiveness of the material. As a consequence, it has been the endeavor of the most advanced prior art workers to carry on the calcining of dicalcium orthophosphate dihydrate in such a way that the end product contains only a limited proportion of beta phase (less than about 50%).

It has now been found that the fluoride compatibility of calcium pyrophosphate can be substantially improved by increasing the proportion of beta phase and that this can be accomplished without unduly increasing the abrasiveness of the material. It is, in fact, possible to produce a calcium pyrophosphate dental abrasive which is substantially all beta phase, but which nevertheless has a dentin abrasion value within acceptable limits as determined by procedures hereinafter set forth.

Accordingly, it is an object of this invention to provide abrasives which are highly compatible with fluoride ions, but which have desirable low dentin abrasion values.

It is a further object of this invention to provide a method for preparing calcium pyrophosphate dentifrice abrasives which possess a high degree of compatibility with fluoride ions and yet are not excessively abrasive.

It is a further object of this invention to provide a dentifrice composition which possesses high cleaning and low dentin abrasion characteristics and which is capable of supplying fluoride ion to the teeth even after prolonged periods of storage.

Other objects and advantageous features will be apparent from the following detailed description.

In general, the dentifrice abrasive of this invention is comprised of a predominantly beta-phase calcium pyrophosphate characterized by high fluoride compatibility and a low dentin abrasion value (as determined by the method set forth infra) and having a median particle size within the range from about 6 to 10 microns. This material is prepared by subjecting a predominantly gamma phase calcium pyrophosphate starting material to a uniform, relatively short, high temperature treatment designed to effect rapid conversion of the material to the beta phase, followed by prompt cooling.

Unless otherwise indicated, temperatures stated herein refer to the temperatures of the material under treatment.

The phase composition of calcium pyrophosphate can be determined by X-ray diffraction patterns or by infrared absorption spectra using techniques fully described in the Borge et al. patent cited above.

The calcium pyrophosphate of this invention will have a beta-phase content greater than about 50% with the balance being substantially all gamma phase. In general, fluoride compatibility increases with increasing proportions of beta phase, hence, the preferred abrasives contain at least about 70% beta phase, more preferably 80% beta phase calcium pyrophosphate. Although fluoride compatibility will improve at higher beta phase levels, so also will the dentin abrasion increase beyond the preferred range.

Fluoride compatibility of the abrasives of this invention is determined as follows:

10.0 g. samples of the abrasive are shaken for a period of 1 hour with 100 ml. portions of a solution containing 250 p.p.m. of fluoride (added as $SnF_2$), and then the mixtures are centrifuged and aliquots are taken of the clear supernatant liquid. The aliquots are analyzed for fluorine by means of the well known Willard and Winter procedure which includes distillation in the presence of perchloric acid and titration of the distillates against thorium nitrate in the presence of alizarin sulfonate. Hydroxylamine hydrochloride and sodium chloride were added to the distillates before the titrations in accordance with the recommendation of H. A. Williams in the Analyst 71, 175 (1946). The amount of fluorine remaining in the supernatant is termed "available" fluorine and is expressed as percent of the original fluorine in the solution. The higher percentage values indicate greater compatibility.

Although any improvement in the fluoride compatibility of the abrasive will help to prolong the shelf life of a toothpaste containing fluorides, the preferred abrasives of this invention have fluoride compatibilities greater than about 60%. Compatibility of this and greater magnitudes may readily be obtained by known methods of heat treatment of calcium phosphates, but the accompanying gross increase in dentin abrasion values associated with increases in fluoride compatibility heretofore attained, drastically impairs the utility of such abrasives in dentifrice compositions. Dentifrice abrasives having fluoride compatibilities of 80% greater, but which have dentin abrasion values of 600 or lower can readily be prepared by the process of this invention.

The dentin abrasion values employed herein are obtained by the method of Grabenstetter et al., described in the Journal of Dental Research, 37, 1060 (1958).

Abrasives having dentin abrasion values greater than about 700 are not satisfactory for dentifrice usage. The cleaning agents of this invention will in all cases have dentin abrasion values of less than about 700. Preferably, these materials will have dentin abrasion values of less than 600, or more preferably 500 or less.

The size of the abrasive particles after heat treatment in accordance with this invention will be approximately the same size as the starting material. The preferred starting material will have a median particle size of from about 6 to about 10 microns and comprise substantially no particles less than 1 micron. If a larger proportion of the abrasive particles in the ultimate formulation have diameters greater than 20 microns, they may cause an unpleasant gritty sensation in the mouth. Preferably 80% of the dentifrice abrasive particles should have diameters ranging from about 3 to 20 microns. The proper particle size is attained by grinding and by screening operations as may be required before and/or after the heat treatment of this invention.

The individual particles of the abrasives of this invention are made up of a large number of smaller units called crystallites. If in heat treatment the calcium pyrophosphate is subjected to elevated temperatures for prolonged periods, the beta phase crystallites grow and the dentin abrasion value of the material increases. For example, if dicalcium orthophosphate dihydrate is placed in bulk quantities in pans, and is heated in an oven or furnace at a temperature of around 800° C., for a sufficient length of time to effect substantial conversion to beta phase calcium pyrophosphate, a non-uniform heat treatment will occur and the crystallites of the exterior particles of the mass will grow and the product will have a dentin abrasion value in excess of 1000 even though the material is of the preferred particle size. This explains why former workers in the art entertained the erroneous notion that the presence of a preponderance of beta phase material was itself inimical to a low dentin abrasion value and endeavored to obtain a product which contained only limited amounts of it.

The term "starting material" is used herein to designate a suitable calcium pyrophosphate just prior to the heat treatment of the present invention. The starting material can be produced by the molecular dehydration of dicalcium orthophosphate dihydrate or anhydrous dicalcium orthophosphate in various ways, for example, by the method of Broge et al., U.S. 2,876,168, or Thomas, U.S. 2,901,400. For reasons of economy, a bulk heat treatment will normally be involved in the production of the starting material, and to assure minimum conversion to beta phase calcium pyrophosphate the temperatures of this heat treatment should not exceed about 700° C.

The characteristics of the starting material are as follows:

(a) It must be predominantly gamma phase calcium pyrophosphate. Preferably, the beta phase content will not be greater than about 20%.
(b) It should have a particle size within the preferred range set forth above for the final product.
(c) It must have a dentin abrasion value of less than about 500, preferably less than 350.

The conversion of such a starting material to predominantly the beta phase without increasing its dentin abrasion value beyond the acceptable maximum limit of 700 is accomplished by subjecting the particulate starting material to a brief heat treatment at a temperature high enough to effect prompt conversion to the beta phase, employing apparatus and techniques which will assure uniform exposure of the mass to the heating media, followed promptly by cooling. The material must be brought to a temperature above about 700° C. but not higher than about 900° C., preferably from about 750° C. to 800° C. Temperatures higher than about 900° C. are likely to result in sintering and crystallite growth.

Time-temperature relationships at which the calcium pyrophosphate particles will fuse together must be avoided. It is also necessary to avoid conditions making for undue growth of the beta phase crystallites. If the starting material contains proportions of beta phase greater than about 20%, the time and temperature of the treatment must be more closely controlled. Desirably, lower temperatures and/or shortened treatment times will be employed in such a case to prevent untoward beta phase crystallite growth in the initially present beta phase material.

The gamma phase portion of the starting material converts very rapidly to the beta phase, so that hold times (time at temperature) of about 2 minutes or less are sufficient to effect substantial conversion to beta phase in the temperature range from about 850° C. to 900° C. using a fluo-solids reactor, for example, even though the heat-up time using this apparatus is relatively short. In no event should the combined heat-up and hold time at temperatures above 700° C. be in excess of the time required to effect substantially complete conversion to the beta phase. Optimum time and temperature relationships will, of course, vary with the apparatus employed and may readily be established for the particular equipment to be used.

There are various ways in which the conversion heat treatment can be carried on. For example, it can be accomplished by spreading the starting material thinly and evenly on pans or trays so that all parts of the material can be quickly and uniformly heated and cooled, and either placing the trays in an oven in which the temperature can be varied quickly, or passing the trays at suitable rates of speed through heating and cooling zones.

All of the calcium pyrophosphate under treatment must be brought to the required temperature relatively quickly and simultaneously, cooling the material in like manner. Consequently, procedures are preferred in which the individual particles can be separated and brought into intimate contact with gaseous heating and cooling media. Thus, rotary kilns which pick up the material and shower it downwardly through the gaseous media can be used, providing the throughput of the material and the volume and temperatures of the gas can be adequately controlled. A preferred procedure involves fluidization, as in fluo-solids reactors well known in the art.

It does not constitute a departure from the spirit of the invention to carry on the conversion heat treatment just described as part of or a continuation of a preceding heat treatment, and this may be done especially when the apparatus is such that the heating and cooling media is brought into intimate contact with the particles while in a separated condition. Thus, it is possible, using fluidization, for example, to convert dicalcium orthophosphate dihydrate to the product of this invention in a continuous heat treatment provided the initial phase of treatment is controlled to yield the required starting material prior to the terminal high temperature treatment disclosed herein.

The final product will consist of particles having a median diameter of from about 6 to about 10 microns, each particle being made up of a large number of beta phase crystallites. The structure and the friability of these particles is unusually similar to the structure and friability of the gamma phase precursor. It is this conversion to beta phase without altering the structure and particle friability which is believed to be responsible for the unique attributes, i.e., high compatibility and low dentin abrasion, of the abrasives of this invention.

Table I below sets forth the dentin abrasion value, fluoride compatibility and beta phase composition of illustrative examples prepared by fluidization of predominantly gamma-phase calcium pyrophosphate in a gas stream heated to the indicated bed temperatures and held in the bed for the indicated detention times in the following manner:

The apparatus employed was a fluo-solids reactor consisting of a nine foot stainless steel tube having an inner diameter of four inches. The tube was mounted vertically within an insulating fire brick chimney. Hot gases, formed by ignition of propane in a combustion chamber were directed upward through a constriction plate to fluidize the bed. To help attain the operating temperature more rapidly and to off-set radiation losses, the tube was also heated externally by means of four Maxon burners. A pressurized table feeder entering the reactor through a side feed pipe 3.5 feet above the construction plate was used to meter the starting material into the reactor.

The empty reactor was preheated to operating temperature by passing the hot gasses from the combustion chamber through it and by applying external heat. The starting material was forced into the reactor and fluidized for the desired detention time by the hot gases. (The heat-up time is also indicated for each example.) The treated material was then promptly discharged into stainless steel trays and air cooled.

The starting material employed in each of the examples of Table I was calcium pyrophosphate being 86.2% gamma phase (the balance being beta phase) and having a median particle size of 6 microns. This material had a dentin abrasion value of 373 and a fluoride compatibility of 40.8%.

TABLE I

| Example | Temp. | Heat-up Time (min.) | Detention Time (min.) | Percent Beta Phase | Dentin Abrasion | Fluoride Compatibility |
|---------|-------|---------------------|-----------------------|--------------------|-----------------|------------------------|
| I       | 700   | 6                   | 8                     | 82.5               | 479             | 83.2                   |
| II      | 700   | 6                   | 16                    | 86.0               | 569             | 82.8                   |
| III     | 750   | 18                  | 4                     | 96.0               | 571             | 88.0                   |
| IV      | 800   | 20                  | 0                     | 93.6               | 675             | 85.6                   |

As can be seen from the above table, heat treatment in accordance with this invention yields a product having markedly increased fluoride compatibility but with dentin abrasion values within acceptable limits.

*Example V*

A charge of calcium pyrophosphate comprised of 86.2% gamma phase (the balance being beta phase) having a median particle size of 6 microns and a dentin abrasion value of 373 was introduced into the above described fluo-solids reactor heated to 900° C. Heat-up time using this continuous process was essentially instantaneous and average detention time at temperature was less than two minutes. The resulting product was 70.8% beta phase calcium pyrophosphate with the balance being substantially gamma phase. The product had a dentin abrasion value of 669 and fluoride compatibility of 68.0%.

Additional samples of the abrasives of this invention were prepared using tray heat treatment equipment as follows: A Lindbergh furnace was preheated to the desired temperature. 250 grams of calcium pyrophosphate having a beta phase content of 12.3% (the balance substantially gamma phase), a dentin abrasion value of 275 and a fluoride compatibility of 35.0% was placed in a 12"×6"×¾" stainless steel tray with a thermocouple located in the middle of the material. The approximate thickness of the material in the tray was limited to ⅜" to assure uniform heating and cooling. The tray was then placed in the pre-heated oven and thermocouple readings were taken every 30 seconds during the heat-up period. After the sample reached the desired temperature it was held in the furnace for the indicated time intervals. It was then removed and quickly air cooled. Table II below indicates the temperature and detention time employed for Examples VI–X and the characteristics of the resulting products.

TABLE II

| Example | Temp. | Heat-up Time (min.) | Detention Time (min.) | Percent Beta Phase | Dentin Abrasion | Fluoride Compatibility |
|---------|-------|---------------------|-----------------------|--------------------|-----------------|------------------------|
| VI      | 700   | 10                  | 30                    | 81.5               | 482             | 83.2                   |
| VII     | 750   | 10                  | 5                     | 51.9               | 402             | 77.6                   |
| VIII    | 750   | 9                   | 12                    | 86.01              | 530             | 82.8                   |
| IX      | 750   | 10.5                | 20                    | 87.3               | 534             | 80.0                   |
| X       | 800   | 8                   | 6                     | 100.0              | 695             | 96.0                   |
| Control* | 800  | *                   | 60                    | 100.0              | 1,160           | 80.0                   |

*For purposes of comparison, dicalcium orthophosphate dihydrate was heat-treated as described above. It was found that prolonged heat treatment (heating for a time greater than is required to effect complete conversion to beta phase calcium pyrophosphate) resulted in dentin abrasion values far in excess of the maximum acceptable value of 700. (Heat-up time was not considered significant for this example.)

In general, the results obtained using the tray heating techniques parallel those obtained with the fluo-solids reactor; however, at the higher temperature ranges (850°–900° C.) it was found to be difficult to achieve a sufficiently short heat-up and detention time to prevent beta phase crystallite growth and the accompanying increase in dentin abrasion.

The dentifrice abrasives of this invention are either substantially entirely beta-phase calcium pyrophosphate or mixtures of gamma and beta-phase calcium pyrophosphate wherein the beta phase comprises more than 50% of the mixture, having a dentin abrasion value not greater than about 700, while being compatible with fluoride ion to the extent of at least about 60%, said abrasives being prepared by heat treating a predominantly gamma phase calcium pyrophosphate to temperatures above about 700° C. for a time sufficient to accomplish the required phase conversion, but insufficient to effect substantial growth in beta phase crystallites. Although the abrasives of this invention may be used in a wide variety of dentifrice formulations, they are of special utility in toothpaste compositions containing fluoride ions.

In a toothpaste the abrasive constitutes from about 20% to about 50%, preferably from 30 to 40% of the total composition. In a tooth powder, higher proportions of abrasive, up to about 95%, are used.

In a fluoride-containing dentifrice including the abrasives of this invention, fluoride ions can be supplied by any innocuous water soluble fluoride compound which is capable of providing at least about 100 p.p.m. of fluoride ions on contact with water. By innocuous is meant a compound which is not undesirably toxic, highly colored, or otherwise objectionable for use in a dentifrice. Examples of suitable water soluble fluoride compounds are sodium fluoride, potassium fluoride, ammonium fluoride, indium fluoride, palladium fluoride, ferrous fluoride, lithium fluoride, fluorosilicates, e.g., $Na_2SiF_6$, fluorozirconates, e.g., $Na_2ZrF_6$, fluoroborates, e.g., $NaBF_4$ and fluorotitanates. Preferably the fluoride salts employed in conjunction with the abrasives of this invention will also contain stannous ions for the additional beneficial effects derived from these enamel solubility reducing cations. Examples of suitable stannous compounds are stannous fluoride, mixed halides such as stannous chlorofluorides and fluorostannites. Stannous tin may also be supplied from soluble stannous compounds other than a fluoride, e.g., stannous chloride or stannous gluconate.

Although the above fluoride compounds are all inorganic salts, it is not necessary that such salts be employed as the source of the fluoride ions. Fluoride ions may also be supplied by organic fluorides which are water soluble or at least dissociate to give fluoride ions in contact with water. Fluoride ions can also be supplied by organic hydrofluorides, e.g., amino acid hydrofluorides and amine hydrofluorides, amine fluorides, and mono-, di- and triethanolamine fluorides and hydrofluorides. Examples of suitable organic fluorides of these types are disclosed in Canadian Patents 543,066 and 594,533 and in a publication by H. R. Mühlemann et al. in Helvetica Odontologica Acta, vol. 1, No. 2, page 23 (1957).

The quantity of the water soluble fluoride compounds which is used for efficacious results in the fluorine-containing dentifrices prepared with the abrasives of this invention should be an amount equivalent to at least 25 parts of fluoride ions per million parts of dentifrice. Extremely large amounts of fluoride ions do not appreciably enhance the desirable properties of the dentifrice and may cause it to have toxic effects. Accordingly, these dentifrices do not contain more than about 4000 parts ionized and un-ionized fluorine per million parts of dentifrice, and preferably not more than about 1000 parts of fluorine per million parts of dentifrice.

Dentifrices containing fluoride ions should have a pH in the range from about 3 to about 7, preferably about 4.5 to 7. When stannous tin is present in the dentifrice the pH is preferably in the range from about 3.5 to 5.

In preparing such toothpastes, it is desirable to employ binders which do not tend to react with and inactivate the fluoride salts. For example, if stannous fluoride is used as the fluoride salt, preferred binders are hydroxyethyl cellulose and sodium carboxymethyl cellulose. The sudsing agents commonly used in current dentifrice compositions may be used in the dentifrices of this invention. These include alkyl sulfates, monoglyceride sulfonates, alkyl sulfoacetates, sarcosides, and the like. Other materials such as coloring, humectant, flavor and sweeteners may be used.

*Example XI*

A toothpaste formulation embodying the abrasive of this invention was prepared having the following composition:

| | Percent |
|---|---|
| Calcium pyrophosphate [1] | 39.00 |
| Stannous pyrophosphate | 1.00 |
| Stannous fluoride | 0.40 |
| Sorbitol | 20.00 |
| Synthetic detergent | 1.50 |
| Glycerine | 10.00 |
| Sodium carboxymethyl cellulose | 1.05 |
| Magnesium aluminum silicate | 0.40 |
| Minor ingredients | 1.40 |
| Water | Balance |

[1] Example III, Table I.

Table III sets forth the available fluoride of toothpaste as it aged at room temperature.

TABLE III

| Time after making: | Percent available fluoride |
|---|---|
| Fresh | |
| 1 week | 76 (44) |
| 1 month | 68 (36) |
| 2 months | 58 (24) |

The available fluoride in a control toothpaste containing a predominantly gamma-phase (87%) calcium pyrophosphate is given in parentheses.

The texture and consumer characteristics of this product are excellent, the cleaning ability and dentin abrasion being well within acceptable limits. Also an extremely large portion of the original tin remained active and available to react with the dental enamel.

The abrasive employed in the dentifrice formulation may be replaced with any of the abrasives of Examples I through X set forth in Tables I and II above without loss of the excellent consumer qualities of the toothpaste. The aging qualities with respect to available fluoride will vary in relation to the fluoride compatibilities of each example, however, this dentifrice will in all cases be more stable on aging than those containing the art disclosed calcium pyrophosphate abrasives having acceptable dentin abrasion characteristics.

Although the embodiment in the dentifrice formulation above entails the use of the abrasives of this invention in a fluoride-containing dentifrice, it is to be understood that these abrasives are also useful in ordinary dentifrice compositions.

What is claimed is:

1. The method of preparing a dentifrice abrasive characterized by a high ionic compatibility and low dentin abrasion comprising the steps of uniformly heating predominantly gamma phase calcium pyrophosphate having a dentin abrasion value less than about 500, to a temperature above 700° C. but not greater than about 900° C. for a time sufficient to convert more than 50% of the said calcium pyrophosphate to the beta phase, but no longer than is required to convert all of the said calcium pyrophosphate to the beta phase and immediately cooling the resulting product to prevent crystallite growth.

2. An abrasive especially adapted to use in a fluoride containing dentifrice composition comprising a predominantly beta phase calcium pyrophosphate having a dentin abrasion value of less than about 700 and a fluoride compatibility greater than about 60%, said abrasive being derived by uniform heat treatment of a predominantly gamma phase calcium pyrophosphate having a dentin abrasion value of less than 500.

3. A dentifrice composition comprising a water soluble fluoride compound in an amount sufficient to provide at least 25 p.p.m. of fluoride ions, the total fluorine not exceeding about 4000 p.p.m., at least about 1000 p.p.m. of stannous tin and a calcium pyrophosphate abrasive of which at least about 70% is in the beta phase, the balance being substantially gamma phase, said abrasive having a dentin abrasion value less than about 700 and a fluoride compatibility greater than about 60%, said dentifrice having a pH within the range from about 3 to 7.

4. An abrasive according to claim 2 wherein the calcium pyrophosphate is comprised of particles having a median size of from about 6 to about 10 microns, with substantially no particles less than 1 micron.

5. An abrasive according to claim 2 wherein the calcium pyrophosphate is comprised of particles, 80% of which have diameters ranging from about 3 to 20 microns.

6. An abrasive according to claim 2 wherein at least 70% of the calcium pyrophosphate is in the beta phase, said calcium pyrophosphate having a dentin abrasion value of less than 600.

No references cited.